United States Patent [19]

Maples

[11] Patent Number: 4,505,158

[45] Date of Patent: Mar. 19, 1985

[54] THERMAL COMPENSATING GAGE

[75] Inventor: Stephen S. Maples, Adrian, Mich.

[73] Assignee: Acer Automation Company, Adrian, Mich.

[21] Appl. No.: 508,818

[22] Filed: Jun. 29, 1983

[51] Int. Cl.³ .......................... G01B 5/30; G01L 1/14
[52] U.S. Cl. .................................. 73/766; 73/862.55; 73/862.63
[58] Field of Search ................ 73/766, 862.55, 862.63

[56] References Cited

U.S. PATENT DOCUMENTS

| | | | |
|---|---|---|---|
| 2,332,288 | 10/1943 | Zeitlin | 73/766 |
| 2,336,371 | 12/1943 | Shayne et al. | 73/766 |
| 2,664,787 | 1/1954 | Plimmer | 90/13 |
| 3,045,510 | 7/1962 | Brainard | 77/5 |
| 3,074,175 | 1/1963 | Ludlam | 73/766 |
| 3,236,124 | 2/1966 | Rhoades | 77/5 |
| 3,332,153 | 7/1967 | Loewen | 33/125 |
| 3,775,655 | 11/1973 | DuVall | 318/634 |
| 3,921,300 | 11/1975 | Cox et al. | 33/125 |

FOREIGN PATENT DOCUMENTS 1236593  6/1971  United Kingdom ............ 73/766

*Primary Examiner*—Howard A. Birmiel
*Attorney, Agent, or Firm*—Beaman & Beaman

[57] ABSTRACT

A temperature compensated measuring system for measuring linear deformation due to the application of force. Electrical signals produced by a pair of dissimilar metal thermal detectors utilizing a pair of linear variable differential transformers are electrically summed to provide a signal free of thermal influence. Parallel rods of diverse metals are interconnected through one LVDT while a portion of one of the rods is connected to the member to be measured by the other LVDT and the summation of electrical signals permits an electrical thermally compensated readout indicating deformation due to force.

12 Claims, 6 Drawing Figures

U.S. Patent    Mar. 19, 1985    4,505,158
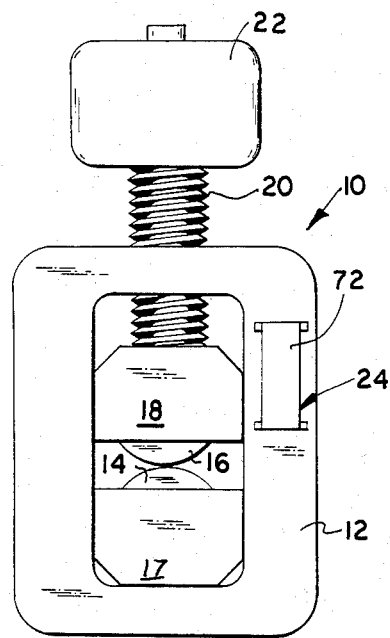
Fig_1.
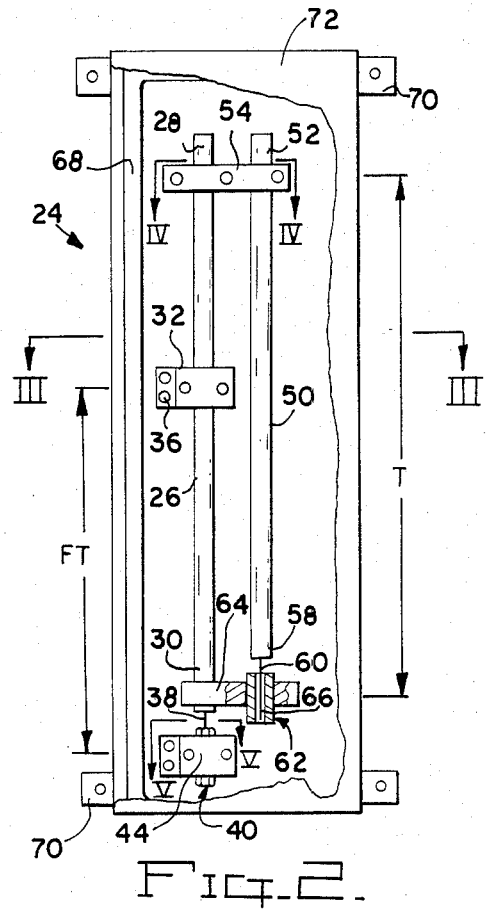
Fig_2.
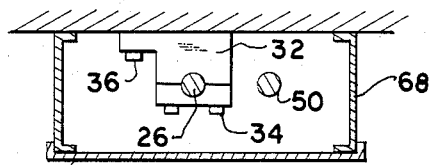
Fig_3.
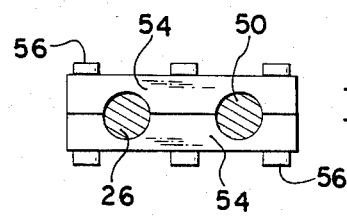
Fig_4.
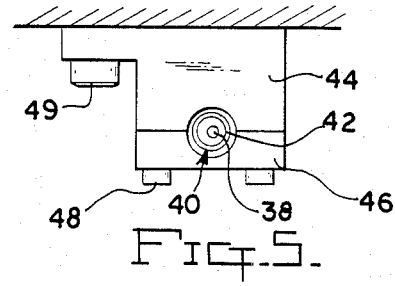
Fig_5.
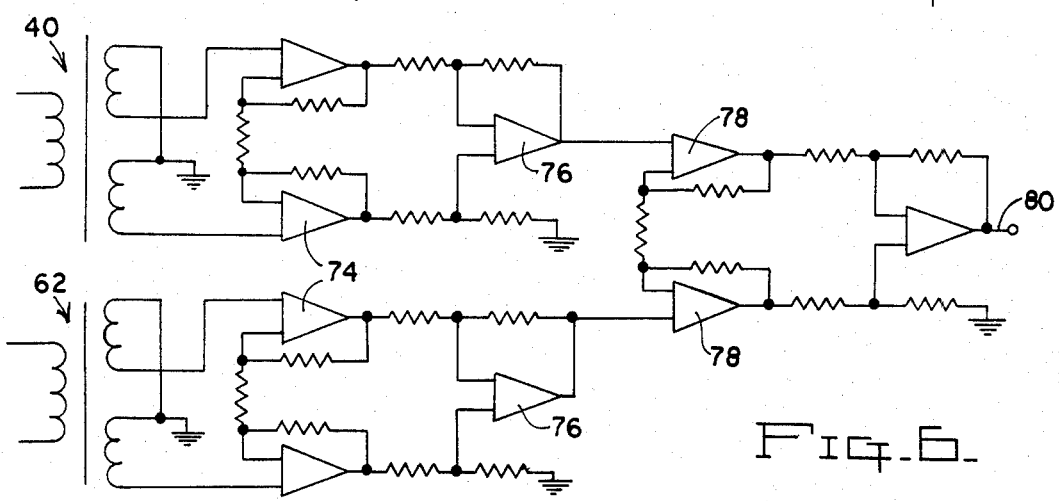
Fig_6.

THERMAL COMPENSATING GAGE

BACKGROUND OF THE INVENTION

Strain gages are utilized to sense and evaluate small linear deformation, and in the usual application the strain gage is firmly affixed to the deforming member such that lengthening of the member due to external forces likewise lengthens the strain gage producing an electric signal that may be diagnosed in terms of distance. Strain gages are often employed in the design of mechanical devices subjected to tension or compression forces and are utilized to analyze strength characteristics and deformation under known loads.

Strain gages have been used with metal processing equipment, such as rolling mills and machine tools, wherein high accuracies are required but due to high pressure forces being imposed upon the apparatus deformation in the metal processing occurs which will result in inaccuracies in the finished product unless compensation occurs. Metal processing equipment is formed of metal which expands and contracts due to thermal influence, and the accuracy of metal processing equipment will depend upon thermal influences as well as external forces being applied thereto. Accordingly, when processing metal under close dimensional tolerances both the metal deformation due to mechanical forces and thermal influences must be considered.

For instance, in metal rolling installations opposed rollers mounted within bearing blocks are employed to impose high compressive forces upon hot steel. The combination of the forces imposed upon the bearing block due to the rolling pressures required, and the high temperature environment, causes the bearing blocks to elongate and expand as the temperature thereof rises during operation, and such temperature changes will vary spacing between the rollers, and the thickness of the steel being rolled, unless adjustment of the roller spacing occurs. Accordingly, there is a great need in the metal rolling arts for means to determine dimensional variations wherein bearing block dimensional changes directly represent mechanical force characteristics and are free of "false readings" due to thermal conditions.

Electrical gaging devices which are thermally compensated are known, and have been used in machine tool and similar applications; typical devices of this type being shown in U.S. Pat. Nos. 2,664,787; 3,045,510; 3,332,153 and 3,775,655. However, such thermal compensation as shown in these patents does not compensate for thermal influences of the gaging equipment itself, and inaccuracies occur due to thermal influences on the gaging apparatus and thermal compensation becomes a compromise between several factors. U.S. Pat. Nos. 3,236,124 and 3,921,300 also disclose temperature compensating systems, and in the latter patent conditions within the gage, itself, are sensed, but patents of this type still fall short of producing a high degree of accuracy when measuring small dimensional variations.

It is an object of the invention to provide a thermally compensated gage capable of electrically indicating mechanical deformation within a metal member, the dimensional signal being substantially free of thermal influence.

A further object of the invention is to provide a thermally compensated gage producing an electrical signal proportional to mechanical deformation substantially free of thermal influence wherein very small mechanical dimensions can be sensed, and yet the apparatus is of a concise and relatively economical character.

Another object of the invention is to provide a thermally compensated gage producing an electrical signal indicating dimensional variation wherein the structure producing thermal compensation is economically combined with the structure indicating mechanical deformation to reduce the complexity of gage construction and minimize cost.

Yet a further object of the invention is to provide a thermally compensated gage utilizing a pair of linear variable differential transformers wherein a substantially uniform temperature is maintained within the gage to assure accurate compensation regardless of conditions.

In the practice of the invention an elongated aluminum rod is affixed substantially at its central region to the metal member to be measured. A component of a linear variable differential transformer, such as the core, is attached to this rod at a location remote from the anchor point. The coil of the LVDT is also affixed to the element to be measured in axial alignment with the aluminum rod, and in this manner mechanical deviations in the metal member between the attachment points of the aluminum rod and LVDT are sensed to produce an electrical signal transmitted to an analyzing and amplifying circuit.

The temperature compensating structure includes a stainless steel rod disposed parallel to the aluminum rod which is attached to the end region of the aluminum rod remote from the previously mentioned LVDT component. The other end of the stainless steel rod includes a component, such as a core, of a second LVDT. The coil of the second LVDT is attached to the aluminum rod adjacent the first LVDT component, and thus, an electrical signal is produced by the second LVDT proportional to changes occurring within the aluminum and stainless steel rod due to thermal influence. The second LVDT is also connected to the analyzing and amplification circuit. The LVDT associated with the aluminum rod provides a signal which varies directly with changes in temperature and with the application of force upon the element being measured, while the LVDT associated with the stainless steel rod provides a signal which varies inversely with changes in temperature. These two signals are summed such that the level of the summed signals does not vary with changes in temperature, and accordingly, the level of the summed signals varies only in readout, as the application of force and mechanical deformation occurs.

In order that the aforementioned apparatus be influenced by actual temperature conditions the rods and LVDTs are encased within a housing attached to the member being sensed, and in this manner the rods will assume a temperature proportional to the temperature of the element being measured, and will not be influenced by radiant heat or the cooling movement of air not directly associated with the element being measured.

BRIEF DESCRIPTION OF THE DRAWINGS

The aforementioned objects and advantages of the invention will be appreciated from the following description and accompanying drawings wherein:

FIG. 1 is a representative view of a typical installation of a gage in accord with the invention as attached to a rolling mill housing, FIG. 2 is an elevational view, partially in section, of a gage in accord with the invention, FIG. 3 is a plan sectional view as taken along Section III—III of FIG. 2, FIG. 4 is a plan sectional view as taken along Section IV—IV of FIG. 2, FIG. 5 is a plan sectional view as taken along Section V—V of FIG. 2, and FIG. 6 illustrates a typical circuit used in conjunction with the gage apparatus of the invention.

DESCRIPTION OF THE PREFERRED EMBODIMENT

A typical application of a thermally compensated gage in accord with the inventive concepts is shown in FIG. 1 wherein a rolling mill station 10 is illustrated which consists of a pair of bearing blocks 17 and 18 usually formed of grey cast iron. The mill housing 12 which supports the bearing blocks and a lower roller 14 and the upper roller 16 are rotatably supported within the bearing blocks mounted upon the threaded adjustment rod 20 which extends through the mill housing 12. An electric motor schematically illustrated at 22 is drivingly associated with the threaded rod 20 through a speed reducer whereby actuation of the motor varies the spacing between the rollers 14 and 16. Hot plate steel passes between the rollers 14 and 16 and the rollers size the plate thickness in the well known manner. Of course, the threaded rod 20 is adjusted to define a clearance therebetween less than the initial thickness of the steel plate being rolled and high tensile forces are applied to the bearing block by the rollers during use.

The vertical height of the bearing block 12 as represented in FIG. 1 will slightly increase because of the high tensile forces applied thereto through the rollers, and due to the high increase in temperature of the bearing blocks which are in close proximity to the hot steel being rolled. As the spacing between the rollers 14 and 16 must be very closely controlled in order to roll the steel plate to accurate tolerances, the deformation that occurs within the bearing block seriously affects the metal processing tolerances and it is necessary to adjust the threaded rod 20 by means of the motor 22 to compensate for bearing block dimensional changes occurring because of tensile forces and thermal expansion.

Accordingly, a thermally compensating gage 24 in accord with the invention is attached to the mill housing 12 at such a location parallel to the tensile forces therein permitting measurement of the vertical dimensional changes of the housing, and by means of the gage the motor 22 is operated to maintain the desired spacing between the rollers to accurately size the plate being rolled.

With reference to FIGS. 2–5, the thermal compensated gage includes an elongated aluminum rod 26 having an upper end 28 and a lower end 30. A split block clamp 32 is firmly attached to the central region of the aluminum rod 26, FIG. 3, by bolts 34, and bolts 36 affix the clamp 32 firmly to the surface of the rolling mill housing 12. At its lower end 30 a core 38 of a linear variable differential transformer (LVDT) is attached in a coaxial relationship and extends into the bore of the LVDT 40 defined by the coils thereof.

The LVDT coils 42 are fixed to the housing 12 by the split block clamp 44 and attached to the block by the cap 46 and bolts 48, FIG. 5. Bolts 49 attach the clamp 44 to the mill housing, and in this manner the coils of the LVDT 40 are fixed relatively to the bearing block at a spaced location with respect to the aluminum rod split block clamp 32.

A stainless steel rod 50 is located parallel to and adjacent the aluminum rod 26 and includes an upper end 52 which is firmly clamped to the upper end 28 of the rod 26 by split blocks 54, FIG. 4, having semicylindrical recesses defined therein for receiving the rods, and clamped together by the bolts 56. The lower end 58 of the stainless steel rod is provided with the LVDT core 60 received within the coils 66 of the LVDT 62.

The linear variable differential transformer 62 is fixed to the lower end 30 of the aluminum rod 26 by a clamping bracket 64, and it will be readily appreciated that a significant spacial distance exists between the blocks 54 and the bracket 64.

The aforedescribed gage structure is mounted within an insulated steel housing or enclosure 68 which is affixed to the mill housing 12. The enclosure 68 is of a rectangular configuration and includes ears 70 having holes therein for receiving fasteners whereby the enclosure may be firmly attached to the mill housing, and by means of seals or caulking can be sealed to the bearing block in an airtight manner.

The enclosure includes a removable cover 72, FIG. 3, and screws, not shown, permit the cover to be firmly attached to the housing and yet provide complete access thereto, when removed.

As the enclosure 68 is directly mounted to the mill housing surface, and as the interior of the enclosure is protected against ambient air circulation, the rods 26 and 50 and other gage components within the housing will be maintained at a temperature substantially equal to that of the mill housing and the gage components will not be subjected to cooling due to air circulation, or other factors which may produce artificial temperatures.

The coils of the LVDTs 40 and 62 are attached to the circuitry shown in FIG. 6, and this circuitry is a common one for summing and balancing purposes including a plurality of resistances in series used in conjunction with buffer stages 74 and adders 76 and amplifiers 78. The output of the circuit of FIG. 6 is at 80, and may be attached to a conventional readout device such as a digital display, an alarm, or the like, and preferably is employed as a control, for operating the motor 22 to automatically maintain the spacing between the rollers 14 and 16 at a predetermined value to insure the desired tolerances of the thickness of the plate being rolled.

The disclosed gage consists of two dissimilar metal detectors. The first detector consists of that portion of the aluminum rod 26 between the block 32 and the core 38, and that portion of the metal (grey iron) of the mill housing 12 between the block 32 and the clamp 44.

The second detector consists of the entire aluminum rod 26 and the stainless steel rod 50, and their associated clamps and LVDT 62. The LVDT 62 provides a signal which varies inversely with changes in temperature, and the LVDT 40 provides a signal which varies directly with changes in temperature and with the temperature forces within the mill housing 12. The signals from these two LVDTs are summed such that the level of the summed signals does not vary with changes in temperature. Accordingly, the level of the summed signals varies only in accord with the mechanical forces imposed upon the mill housing 12, and the signal at the output 80 is free of thermal influence.

By utilizing the aluinum rod 26, and portions thereof, and the two dissimilar metal thermal detectors, a concise thermal compensating gage is achieved with a minimum of components resulting in both space saving and economic advantages. As an example of a typical situation the following relationships are described:

With reference to FIG. 2 the distance FT is that distance separating the block 32 and clamp 44, and equals 6". The coefficient of linear thermal expansion of the aluminum rod is $12.0 \times 10^{-6}$ in/in° F. Assuming that the mill housing 12 is formed of grey iron casting the coefficient of linear thermal expansion is $6.0 \times 10^{-6}$ in/in° F., at a temperature increase of 75° F. the relative displacement of the aluminum rod to the machine tool member is:

$$12.0 \times 10^{-6} - 6.0 \times 10^{-6} = 6.0 \times 10^{-6} \text{ in/in°F.}$$
$$\times 6 \text{ inches}$$
$$\times 75 \text{ degrees F.}$$
$$2.7 \times 10^{-3} \text{ in} = .0027"$$

This relative displacement is positive and the aluminum rod expanded 0.0027" further than the mill housing.

Representing the distance between the clamp 54 and the bracket 64 as T, and assuming T to equal 12", and with the coefficient of linear thermal expansion of the stainless steel rod being $9.0 \times 10^{-6}$ in/in° F., and if an increase in temperature of 75° F. occurs, then the relative displacement of the stainless steel rod to the aluminum rod is:

$$9.0 \times 10^{-6} - 12.0 \times 10^{-6} = -3.0 \times 10^{-6} \text{ in/in°F.}$$
$$\times 12 \text{ inches}$$
$$\times 75 \text{ degrees F.}$$
$$-2.7 \times 10^{-3} \text{ in.} = -.0027"$$

In this instance the displacement is negative and the stainless steel rod expands 0.0027" less than the aluminum rod.

As the two detectors cancel each other out with respect to thermal expansion the LVDT 40 produces a processed signal representing only expansion of the mill housing 12 due to mechanical forces therein, and appropriate adjustments will be produced at the rollers by the motor 22.

Of course, the inventive concepts may be utilized in applications wherein the forces upon the element being sensed are compressive, rather than tensile, and it is appreciated that various modifications to the inventive concepts may be apparent to those skilled in the art without departing from the spirit and scope of the invention.

I claim:

1. A temperature compensated measuring system for measuring linear stress variations within a thermally expandable and contractable metal element stressed in a given direction comprising in combination, a first dissimilar metal thermally expandable and contractable linear detector producing a first electrical signal proportional to the stress imposed upon the element in the given direction and the temperature of the element and of the first detector, a second dissimilar metal thermally expandable and contractable linear detector producing a second electrical signal inversely proportional to the temperature of said first detector, an electrical signal summing device connected to said first and second linear detectors receiving and processing said first and second signals to produce a third electrical signal representing the linear dimension of the metal element in the given direction free of thermal influence, and utilization means connected to said summing device utilizing the value of said third signal.

2. In a temperature compensated measuring system as in claim 1, means maintaining the metal element, said first linear detector and said second linear detector at substantially the same temperature.

3. In a temperature compensated measuring system as in claim 2, said means maintaining the element and said linear detectors at substantially the same temperature comprising a housing enclosing said detectors.

4. In a temperature compensated measuring system as in claim 2, said first linear detector including a first elongated thermally expandable and contractable rod mounted adjacent the metal element substantially parallel to the element given direction, said second linear detector including a second elongated thermally expandable and contractable rod substantially parallel to the element given direction, said first rod comprising a portion of said second linear detector.

5. In a temperature compensated measuring system as in claim 2, said first and second linear detectors each comprising first and second elongated thermally expandable and contractable components of dissimilar metal disposed substantially parallel to the metal element given direction, electrical signal generating means interposed between said first and second components of each detector sensing linear displacement and position between said first and second components in the given direction, said second component of said first detector comprising a portion of said first component of said second detector.

6. In a temperature compensated measuring system as in claim 5, the metal element comprising said first component of said first linear detector.

7. In a temperature compensated measuring system as in claim 6, said first detector second component comprising an elongated aluminum rod and said second detector second component comprising an elongated stainless steel rod, a bracket connecting said stainless steel rod to said aluminum rod and said second detector signal generating means interposed between said aluminum and stainless steel rods in a location spaced from said bracket in the direction of the given direction.

8. A temperature compensated measuring system for measuring linear stress variations within a thermally expandable and contractable element stressed in a given direction comprising, in combination, first and second brackets adapted to be attached in spaced relationship in the given direction to the element to be measured, a first elongated metal rod adapted to be oriented substantially parallel to the given direction, said second bracket being attached to said rod, first cooperating electrical sensing means interposed between said first bracket and said rod sensing the positional relationship between said first bracket and rod producing a first electrical signal indicating movement of said first and second brackets and length changes in said first rod in the given direction, third and fourth brackets fixed to said rod in spaced relationship thereon, a second elongated metal rod attached to said third and fourth brackets substantially parallel to said first rod, the metal of said first and second rods being dissimilar, second cooperating electrical sensing means interposed between said fourth bracket and said second rod sensing the positional relationship between said fourth bracket and said second rod producing a second electrical signal indicating length changes in said first rod and said second rod, and control means receiving and processing said first and second signals producing a utilization signal substantially devoid of thermal influence.

9. In a temperature compensated measuring system as in claim 8, said first rod being of aluminum and said second rod being stainless steel.

10. In a temperature compensated measuring system as in claim 8, said first and second electrical sensing means comprising linear variable differential transformers having relatively movable coils and cores.

11. In a temperature compensated measuring system as in claim 8, said first electrical sensing means first signal being proportional to temperature changes, said second electrical sensing means second signal being inversely proportional to temperature changes and said control means summing said first and second signals.

12. In a temperature compensated measuring system as in claim 8, a housing, said brackets, rods and electrical sensing means being mounted within said housing.

* * * * *